(12) United States Patent
Zhao et al.

(10) Patent No.: US 9,790,314 B2
(45) Date of Patent: Oct. 17, 2017

(54) VISCOELASTIC SOUND-ABSORBING POLYURETHANE FOAM AND PREPARATION METHOD THEREOF

(71) Applicants: Wanhua Chemical (Beijing) Co., Ltd., Beijing (CN); Wanhua Chemical Group Co., Ltd., Yantai (CN); Wanhua Chemical (Ningbo) Co., Ltd., Ningbo (CN)

(72) Inventors: Jun Zhao, Beijing (CN); Chen Shen, Beijing (CN); Yi Zhao, Beijing (CN); Peng Wei, Beijing (CN)

(73) Assignees: Wanhua Chemical (Beijing) Co., Ltd. (CN); Wanhua Chemical Group Co., Ltd. (CN); Wanhua Chemical (Ningbo) Co., Ltd. (CN)

(*) Notice: Subject to any disclaimer, the term of this patent is extended or adjusted under 35 U.S.C. 154(b) by 0 days.

(21) Appl. No.: 14/441,710

(22) PCT Filed: Jan. 27, 2014

(86) PCT No.: PCT/CN2014/071578
§ 371 (c)(1),
(2) Date: May 8, 2015

(87) PCT Pub. No.: WO2014/134992
PCT Pub. Date: Sep. 12, 2014

(65) Prior Publication Data
US 2015/0284500 A1    Oct. 8, 2015

(30) Foreign Application Priority Data

Mar. 5, 2013 (CN) .......................... 2013 1 0076318

(51) Int. Cl.
| | |
|---|---|
| C08G 18/48 | (2006.01) |
| C08G 18/66 | (2006.01) |
| C08G 18/08 | (2006.01) |
| C08G 18/18 | (2006.01) |
| C08G 18/76 | (2006.01) |
| C08G 18/50 | (2006.01) |
| C08G 18/72 | (2006.01) |
| C08G 101/00 | (2006.01) |

(52) U.S. Cl.
CPC ............. *C08G 18/14* (2013.01); *C08G 18/18* (2013.01); *C08G 18/1808* (2013.01); *C08G 18/1825* (2013.01); *C08G 18/1833* (2013.01); *C08G 18/482* (2013.01); *C08G 18/4804* (2013.01); *C08G 18/4812* (2013.01); *C08G 18/4816* (2013.01); *C08G 18/4883* (2013.01); *C08G 18/5024* (2013.01); *C08G 18/6677* (2013.01); *C08G 18/6688* (2013.01); *C08G 18/721* (2013.01); *C08G 18/7621* (2013.01); *C08G 18/7664* (2013.01); *C08G 2101/0058* (2013.01); *C08G 2101/0083* (2013.01); *C08G 2350/00* (2013.01)

(58) Field of Classification Search
CPC ....................... C08G 18/4804–18/4816; C08G 18/7675–18/7692; C08G 18/4833–18/4845; C08G 18/4837–18/485
See application file for complete search history.

(56) References Cited

U.S. PATENT DOCUMENTS

| | | | |
|---|---|---|---|
| 6,391,935 B1 | 5/2002 | Hager et al. | |
| 2004/0044091 A1 | 3/2004 | Niederoest et al. | |
| 2004/0254256 A1* | 12/2004 | Lockwood | ......... C08G 18/1833 521/174 |
| 2007/0197675 A1 | 8/2007 | Matsumoto | |
| 2009/0215918 A1* | 8/2009 | Sasaki | ................. C08G 18/283 521/174 |
| 2009/0292037 A1* | 11/2009 | Butler | ................. C08G 18/163 521/170 |

(Continued)

FOREIGN PATENT DOCUMENTS

| | | |
|---|---|---|
| CN | 1229803 A | 9/1999 |
| CN | 1572186 A | 2/2005 |

(Continued)

OTHER PUBLICATIONS

Machine Translation of CN101016368A. Aug. 15, 2007.*
International Search Report for Application No. PCT/CN2014/071578 dated May 9, 2014.

*Primary Examiner* — Robert C Boyle
*Assistant Examiner* — Stephen Rieth
(74) *Attorney, Agent, or Firm* — Lerner, David, Littenberg, Krumholz & Mentlik, LLP

(57) ABSTRACT

The present invention discloses a viscoelastic sound-absorbing polyurethane foam and a method for preparing the same, the foam being prepared by reacting a polyisocyanate composition and an isocyanate reactive component. The isocyanate reactive component comprises, based on the weight of mixed polyethers, 30-80 wt % of (bii) a copolyol of epoxypropane-epoxyethane, or a conjugate thereof, wherein the content of oxy-ethylidene unit is 5-35 wt %; 2-20 wt % of (biii) a copolyol of epoxypropane-epoxyethane, or a conjugate thereof, wherein the content of oxy-ethylidene unit is 70-100 wt %; and 20-70 wt % of (biv) a copolyol of epoxypropane-epoxyethane, or a conjugate thereof, wherein the content of oxy-ethylidene unit is 0-20 wt %. The sound-absorbing foam of the present invention has a ball rebound rate of 15-30% and good sound absorption performance.

15 Claims, No Drawings

(56) References Cited

U.S. PATENT DOCUMENTS

| | | | | |
|---|---|---|---|---|
| 2012/0028024 A1* | 2/2012 | Obi | ...................... | C08G 18/283 |
| | | | | 428/304.4 |
| 2012/0251727 A1* | 10/2012 | Shimizu | ............... | C08G 18/482 |
| | | | | 427/373 |
| 2013/0150476 A1* | 6/2013 | Martin | ....................... | C08J 9/00 |
| | | | | 521/170 |

FOREIGN PATENT DOCUMENTS

| | | | |
|---|---|---|---|
| CN | 1606580 | A | 4/2005 |
| CN | 1618834 | A | 5/2005 |
| CN | 1749292 | A | 3/2006 |
| CN | 1831025 | A | 9/2006 |
| CN | 1849351 | A | 10/2006 |
| CN | 1910650 | A | 2/2007 |
| CN | 1922230 | A | 2/2007 |
| CN | 101016368 | A * | 8/2007 |
| CN | 101160366 | A | 4/2008 |
| CN | 101238163 | A | 8/2008 |
| CN | 101410430 | A | 4/2009 |
| CN | 101412798 | A | 4/2009 |
| CN | 101903434 | A | 12/2010 |
| CN | 102504175 | A | 6/2012 |
| EP | 0934962 | A1 | 8/1999 |
| EP | 1457508 | A1 | 9/2004 |
| EP | 1666514 | A1 | 6/2006 |
| WO | 2010009205 | A1 | 1/2010 |

* cited by examiner

VISCOELASTIC SOUND-ABSORBING POLYURETHANE FOAM AND PREPARATION METHOD THEREOF

CROSS-REFERENCE TO RELATED APPLICATIONS

The present application is a national phase entry under 35 U.S.C. §371 of International Application No. PCT/CN2014/071578 filed Jan. 27, 2014, which claims priority from Chinese Application No. 201310076318.3, filed Mar. 5, 2013, all of which are hereby incorporated herein by reference.

FIELD OF THE INVENTION

The present invention relates to a viscoelastic sound-absorbing polyurethane foam and the preparation method thereof, and particularly to a viscoelastic polyurethane foam with low rebound rate and excellent sound absorption performance in a wide range from low frequency to high frequency and the preparation method thereof.

BACKGROUND OF THE INVENTION

Viscoelastic polyurethane foams, also known as slow-recovery foams, show slow recovery in a cyclic compressive process, and thus they have high hysteretic properties, usually as well as low ball rebound rates. These properties mainly relate to the intrinsic structures of foamed polymers. One method is to control the glass transition temperature of the foam around room temperature by choosing the components. Another method is to limit the speed of air flowing in and out of the foam by controlling the foam structure.

One common approach to controlling the glass transition temperature of a viscoelastic foam is to mixed use the polyether having a low hydroxyl value and the polyether having a high hydroxyl value. For example, Chinese patent applications CN1606580A, CN1572186A and CN1229803A are all based on this theory. Another approach to providing viscoelastic performance is to add monohydric alcohols. For example, Chinese patent application CN1831025A relates to using 10 to 25 parts of a monohydric alcohol having a molecular weight of 200 to 500; U.S. Pat. No. 6,391,935B1 relates to using 15 to 70 parts of a monohydric alcohol having a hydroxyl value of less than 56 mgKOH/g; and WO2010/009205A1 relates to using 1 to 20 parts of a monohydric alcohol or a mixture of multiple monohydric alcohols.

At present, the viscoelastic polyurethane foam usually has a ball rebound rate of less than 15% (as described in Chinese patent applications CN101412798A, CN101160366A, CN1922230A, etc.). Moreover, the size of the cells of viscoelastic polyurethane foams having a density of 50-70 kg/m³ is relatively large and coarse, resulting in a good air permeability but poor sound absorption performance.

Chinese patent application CN1910650A discloses a sound-absorbing system containing a viscoelastic foam, but it does not mention the preparation method of the viscoelastic polyurethane foam and its sound absorption performance. Chinese patent application CN101903434A relates to preparing sound-absorbing material with a maximum sound absorption coefficient of 0.70 or more by using polyols derived from plants, but it does not involve any contents relating to viscoelastic foams. Chinese patent application CN101410430A describes a method for producing polyurethane foam with a density of free rise foam of 5-40 kg/m³, wherein the maximum sound absorption effect of polyurethane foam is achieved at a frequency between 1000 to 2000 Hz. Chinese patent application CN101238163A provides a method for preparing soft polyurethane foam plastics with good vibration characteristics and sound absorption performance, wherein the rebound rate is greater than or equal to 55%, the sound absorption coefficient is about 0.20 at 500 Hz, and the sound absorption coefficient is larger than 0.45 at 1000 Hz and the sound absorption coefficient is larger than 0.90 at 2000 Hz. Chinese patent application CN1849351A provides a soft polyurethane foam and its preparation method; and particularly, the foam has an improved sound absorption performance at a low frequency range, with a sound absorption coefficient of greater than or equal to 0.3 at 500 Hz and a sound absorption coefficient of greater than or equal to 0.55 at 2000 Hz. However, none of the above-mentioned patent documents mentions the viscoelastic polyurethane foam, especially the sound absorption performance of viscoelastic polyurethane foam having a ball rebound rate of 15-30%. The sound absorption performance of viscoelastic polyurethane foam having a ball rebound rate of 15-30% is not involved in the above patent documents, let alone the viscoelastic foam material with excellent sound absorption performance and the preparation method thereof.

SUMMARY OF THE INVENTION

One of the objects of the invention is to provide a viscoelastic polyurethane foam having a low density and excellent sound absorption performance. Besides the viscoelasticity, the foam also has a low density, little odor and excellent sound absorption performance.

Another object of the invention is to provide a method for preparing a viscoelastic polyurethane foam having a low density and excellent sound absorption performance. By the choice of mixing polyether and polyisocyanate composition, the method may be free of or contain less toluene diisocyanate, i.e., the raw materials are of little toxicity. Further, the method may be free of other physical foaming agents other than water and may be free of metal catalysts, thus the method does no harm to human health and the environment.

To achieve the above objects, the present invention comprises the following technical solutions:

The present invention provides a sound-absorbing viscoelastic polyurethane foam, which is prepared by a reaction system comprising the following components:

(a) a polyisocyanate composition comprising 0-5 wt % of toluene diisocyanate, based on the total weight of the polyisocyanate composition, wherein the number average functionality of isocyanate groups is 2-2.4 and the NCO content is 20-35 wt %;

(b) an isocyanate-reactive component comprising:

(bi) water, in an amount of 2-5 wt % of the mixed polyethers' weight;

(bii) a copolyol of epoxypropane-epoxyethane or a conjugate thereof, wherein the content of oxy-ethylidene units is 5-35 wt % with an average functionality of 2-4 and an average hydroxyl value of 20-65 mgKOH/g, which is in an amount of 30-70 wt % of the mixed polyethers' weight;

(biii) a copolyol of epoxypropane-epoxyethane or a conjugate thereof, wherein the content of oxy-ethylidene units is 70-100 wt % with an average functionality of 2-4 and an average hydroxyl value of 20-200 mgKOH/g, which is in an amount of 2-20 wt % of the mixed polyethers' weight;

(biv) a copolyol of epoxypropane-epoxyethane or a conjugate thereof, wherein the content of oxy-ethylidene units is 0-20 wt % with an average functionality of 2-5 and an average hydroxyl value of 180-830 mgKOH/g, which is in an amount of 20-65 wt % of the mixed polyethers' weight;

(bv) a chain extender and/or a cross-linking agent, in an amount of 0-10 wt % of the mixed polyethers' weight;

wherein the mixed polyethers are mixtures of component (bii), component (biii) and component (biv);

(c) a surfactant, in an amount of 0-1 wt % of the mixed polyethers' weight;

(d) a catalyst, in an amount of 0-3.5 wt % of the mixed polyethers' weight; and (e) an optional additive, comprising one or two or more of color pastes, internal mold release agents, flame retardants, fillers, antistatic agents, perfumes, antioxidants, light stabilizers, mineral oils and antimicrobial agents;

wherein the reaction system has an isocyanate index of 0.6-0.9, preferably 0.6-0.8, more preferably 0.6-0.75.

According to the foam of the present invention, preferably, the polyisocyanate composition includes one or two or more of toluene diisocyanate, pure diphenylmethane diisocyanate, poly(diphenylmethane diisocyanate) and isocyanate-terminated polyisocyanate prepolymer; preferably, the polyisocyanate composition comprises 0 wt % of toluene diisocyanate.

According to the foam of the present invention, preferably, in the polyisocyanate composition, the number average functionality of isocyanate groups is 2.1-2.3 and the NCO content is 25-33 wt %.

According to the foam of the present invention, preferably, the amount of component (bi) makes up 2.5-4.5 wt %, preferably 3-4 wt % of the mixed polyethers' weight.

According to the foam of the present invention, preferably, in component (bii), the content of oxy-ethylidene units is in an amount of 8-30 wt % with an average functionality of 2.7-3 and an average hydroxyl value of 30-60 mgKOH/g, which is in an amount of 40-65 wt % of the mixed polyethers' weight; preferably, in component (bii), the content of oxy-ethylidene units is in an amount of 10-28 wt % with an average functionality of 2.7-3 and an average hydroxyl value of 32-58 mgKOH/g, which is in an amount of 45-60 wt % of the mixed polyethers' weight.

According to the foam of the present invention, preferably, in component (biii), the content of oxy-ethylidene units is in an amount of 72-90 wt % with an average functionality of 2.5-3.8 and an average hydroxyl value of 30-100 mgKOH/g, which is in an amount of 3-15 wt % of the mixed polyethers' weight; preferably, in component (biii), the content of oxy-ethylidene units is in an amount of 75-80 wt % with an average functionality of 2.8-3.5 and an average hydroxyl value of 35-60 mgKOH/g, which is in an amount of 5-10 wt % of the mixed polyethers' weight.

According to the foam of the present invention, preferably, in component (biv), the content of oxy-ethylidene units is in an amount of 0-15 wt % with an average functionality of 2-4.8 and an average hydroxyl value of 200-810 mgKOH/g, which is in an amount of 30-60 wt % of the mixed polyethers' weight; preferably, in component (biv), the content of oxy-ethylidene units is in an amount of 0-12 wt % with an average functionality of 2-4.5 and an average hydroxyl value of 220-790 mgKOH/g, which is in an amount of 35-55 wt % of the mixed polyethers' weight.

According to the foam of the present invention, preferably, the amount of component (bv) makes up 0.5-6 wt % of the mixed polyethers' weight; the amount of component (c) makes up 0.2-0.8 wt % of the mixed polyethers' weight; the amount of component (d) makes up 0.5-3 wt % of the mixed polyethers' weight; preferably, the amount of component (bv) makes up 1-5.5 wt % of the mixed polyethers' weight; the amount of component (c) makes up 0.4-0.6 wt % of the mixed polyethers' weight; the amount of component (d) makes up 1-2.5 wt % of the mixed polyethers' weight.

According to the foam of the present invention, preferably, the foam has a density of 50-70 kg/m$^3$, a ball rebound rate of 15-30%, a sound absorption coefficient of 0.15-0.35 at 500 Hz, a sound absorption coefficient of 0.40-0.70 at 1000 Hz and a sound absorption coefficient of 0.80-0.99 at 2000 Hz. The sound absorption coefficient is achieved by determining 22 mm-thick foam via standing wave tube method.

The present invention also provides a preparation method for a sound-absorbing viscoelastic polyurethane foam, which is prepared by a reaction system comprising the following components:

(a) a polyisocyanate composition comprising 0-5 wt % of toluene diisocyanate, based on the total weight of the polyisocyanate composition, wherein the number average functionality of isocyanate groups is 2-2.4 and the NCO content is 20-35 wt %;

(b) an isocyanate-reactive component comprising:
(bi) water, in an amount of 2-5 wt % of the mixed polyethers' weight;

(bii) a copolyol of epoxypropane-epoxyethane or a conjugate thereof, wherein the content of oxy-ethylidene units is 5-35 wt % with an average functionality of 2-4 and an average hydroxyl value of 20-65 mgKOH/g, which is in an amount of 30-70 wt % of the mixed polyethers' weight;

(biii) a copolyol of epoxypropane-epoxyethane or a conjugate thereof, wherein the content of oxy-ethylidene units is 70-100 wt % with an average functionality of 2-4 and an average hydroxyl value of 20-200 mgKOH/g, which is in an amount of 2-20 wt % of the mixed polyethers' weight;

(biv) a copolyol of epoxypropane-epoxyethane or a conjugate thereof, wherein the content of oxy-ethylidene units is 0-20 wt % with an average functionality of 2-5 and an average hydroxyl value of 180-830 mgKOH/g, which is in an amount of 20-65 wt % of the mixed polyethers' weight;

(bv) a chain extender and/or a cross-linking agent, in an amount of 0-10 wt % of the mixed polyethers' weight;

wherein the mixed polyethers are mixtures of component (bii), component (biii) and component (biv);

(c) a surfactant, in an amount of 0-1 wt % of the mixed polyethers' weight;

(d) a catalyst, in an amount of 0-3.5 wt % of the mixed polyethers' weight; and (e) an optional additive, comprising one or two or more of color pastes, internal mold release agents, flame retardants, fillers, antistatic agents, perfumes, antioxidants, light stabilizers, mineral oils and antimicrobial agents;

wherein the reaction system has an isocyanate index of 0.6-0.9, preferably 0.6-0.8, more preferably 0.6-0.75.

According to the preparation method of the present invention, preferably, the polyisocyanate composition includes one or two or more of toluene diisocyanate, pure diphenylmethane diisocyanate, poly(diphenylmethane diisocyanate) and isocyanate-terminated polyisocyanate prepolymer; preferably, the polyisocyanate composition comprises 0 wt % of toluene diisocyanate.

According to the preparation method of the present invention, preferably, in component (bii), the content of oxy-ethylidene units is in an amount of 8-30 wt % with an average functionality of 2.7-3 and an average hydroxyl value of 30-60 mgKOH/g, which is in an amount of 40-65 wt % of the mixed polyethers' weight; preferably, in component (bii), the content of oxy-ethylidene units is in an amount of 10-28 wt % with an average functionality of 2.7-3 and an average hydroxyl value of 32-58 mgKOH/g, which is in an amount of 45-60 wt % of the mixed polyethers' weight.

According to the preparation method of the present invention, preferably, in component (biii), the content of oxy-ethylidene units is in an amount of 72-90 wt % with an average functionality of 2.5-3.8 and an average hydroxyl value of 30-100 mgKOH/g, which is in an amount of 3-15 wt % of the mixed polyethers' weight; preferably, in component (biii), the content of oxy-ethylidene units is in an amount of 75-80 wt % with an average functionality of 2.8-3.5 and an average hydroxyl value of 35-60 mgKOH/g, which is in an amount of 5-10 wt % of the mixed polyethers' weight.

According to the preparation method of the present invention, preferably, in component (biv), the content of oxy-ethylidene units is in an amount of 0-15 wt % with an average functionality of 2-4.8 and an average hydroxyl value of 200-810 mgKOH/g, which is in an amount of 30-60 wt % of the mixed polyethers' weight; preferably, in component (biv), the content of oxy-ethylidene units is in an amount of 0-12 wt % with an average functionality of 2-4.5 and an average hydroxyl value of 220-790 mgKOH/g, which is in an amount of 35-55 wt % of the mixed polyethers' weight.

According to the preparation method of the present invention, preferably, the amount of component (bv) makes up 0.5-6 wt % of the mixed polyethers' weight; the amount of component (c) makes up 0.2-0.8 wt % of the mixed polyethers' weight; the amount of component (d) makes up 0.5-3 wt % of the mixed polyethers' weight; preferably, the amount of component (bv) makes up 1-5.5 wt % of the mixed polyethers' weight; the amount of component (c) makes up 0.4-0.6 wt % of the mixed polyethers' weight; the amount of component (d) makes up 1-2.5 wt % of the mixed polyethers' weight.

DETAILED DESCRIPTION OF THE INVENTION

In the present invention, the mixed polyethers are mixtures of components (bii), (biii) and (biv). In the mixed polyethers of the present invention, the sum of the weight percent of components (bii), (biii) and (biv) is 100 wt %. In the present invention, the amount of oxy-ethylidene units is defined as in component (bii), (biii) or (biv), the ratio of the weight of epoxyethane/(the weight of epoxyethane + the weight of epoxypropane).

In the present invention, the "oxy-ethylidene units" refer to units derived from epoxyethane (EO), and the "oxy-ethylidene units" and the "epoxyethane units" can be used interchangeably. Similarly, the "oxy-propylidene units" refer to units derived from epoxypropane (PO), and the "oxy-propylidene units" and the "epoxypropane units" can be used interchangeably. The "conjugate" refers to two or more products of the same type used in combination.

In the present invention, the "average functionality" is described as follows: an epoxypropane-epoxyethane copolyol or a conjugate thereof is a mixture of homologues. In practical application, the functionality is an average and the average functionality can be calculated by the following method:

$$\overline{f_n} = \frac{\overline{M_n}}{M_e}$$

wherein $\overline{f_n}$ is the average functionality, $\overline{M_n}$ is the number average molecular weight of polyol or a conjugate thereof, $M_e$ is a "hydroxy equivalent" of polyol or a conjugate thereof, i.e., the mass of polyol or a conjugate thereof containing an average of 1 mole of terminal hydroxyl group.

The average hydroxyl value can be calculated by the following method:

$$V_{OH} = \Sigma f_i V_{OHi},$$

wherein $\overline{V_{OH}}$ is the average hydroxyl value, $f_i$ is the mass percentage of each component among the mixture, $V_{OHi}$ is the corresponding hydroxyl value of each component.

In the present invention, the "number average functionality of the polyisocyanate composition" refers to in the polyisocyanate composition, the ratio of the number average molecular weight to "isocyanate group equivalent". The "isocyanate group equivalent" means the mass of the polyisocyanate composition containing an average of 1 mole of terminal isocyanate group.

In the present invention, "more" refers to three or more than three.

The sound-absorbing foam of the present invention has a density of 50-70 kg/m³, a ball rebound rate of 15-30%, a sound absorption coefficient of 0.15-0.35 at 500 Hz, a sound absorption coefficient of 0.40-0.70 at 1000 Hz, a sound absorption coefficient of 0.80-0.99 at 2000 Hz and the maximum sound absorption coefficient of 0.99, as measured on 22 mm-thick foam by standing wave tube method.

In the present invention, a sound-absorbing foam meeting the above-described requirements can be prepared by using a reaction system comprising the following components:

(a) a polyisocyanate composition comprising 0-5 wt % of toluene diisocyanate, based on the total weight of the polyisocyanate composition, wherein the number average functionality of isocyanate groups is 2-2.4 and the NCO content is 20-35 wt %; preferably the number average functionality of isocyanate groups is 2.1-2.3 and the NCO content is 25-33 wt %;

(b) an isocyanate-reactive component comprising:

(bi) water, in an amount of 2-5 wt %, preferably 2.5-4.5 wt %, more preferably 3-4 wt % of the mixed polyethers' weight (bii+biii+biv);

(bii) a copolyol of epoxypropane-epoxyethane or a conjugate thereof, wherein the content of oxy-ethylidene units is 5-35 wt % with an average functionality of 2-4 and an average hydroxyl value of 20-65 mgKOH/g, which is in an amount of 30-70 wt % of the mixed polyethers' weight; preferably, a copolyol of epoxypropane-epoxyethane or a conjugate thereof, wherein the content of oxy-ethylidene units is 8-30 wt % with an average functionality of 2.7-3 and an average hydroxyl value of 30-60 mgKOH/g, which is in an amount of 40-65 wt % of the mixed polyethers' weight; more preferably, a copolyol of epoxypropane-epoxyethane or a conjugate thereof, wherein the content of oxy-ethylidene units is 10-28 wt % with an average functionality of 2.7-3 and an average hydroxyl value of 32-58 mgKOH/g, which is in an amount of 45-60 wt % of the mixed polyethers' weight;

(biii) a copolyol of epoxypropane-epoxyethane or a conjugate thereof, wherein the content of oxy-ethylidene units is 70-100 wt % with an average functionality of 2-4 and an average hydroxyl value of 20-200 mgKOH/g, which is in an amount of 2-20 wt % of the mixed polyethers' weight; preferably, a copolyol of epoxypropane-epoxyethane or a conjugate thereof, wherein the content of oxy-ethylidene units is 72-90 wt % with an average functionality of 2.5-3.8 and an average hydroxyl value of 30-100 mgKOH/g, which is in an amount of 3-15 wt % of the mixed polyethers' weight; more preferably, a copolyol of epoxypropane-epoxyethane or a conjugate thereof, wherein the content of oxy-ethylidene units is 75-80 wt % with an average functionality of 2.8-3.5 and an average hydroxyl value of 35-60 mgKOH/g, which is in an amount of 5-10 wt % of the mixed polyethers' weight;

(biv) a copolyol of epoxypropane-epoxyethane or a conjugate thereof, wherein the content of oxy-ethylidene units is 0-20 wt % with an average functionality of 2-5 and an average hydroxyl value of 180-830 mgKOH/g, which is in an amount of 20-65 wt % of the mixed polyethers' weight; preferably, a copolyol of epoxypropane-epoxyethane or a conjugate thereof, wherein the content of oxy-ethylidene units is 0-15 wt % with an average functionality of 2-4.8 and an average hydroxyl value of 200-810 mgKOH/g, which is in an amount of 30-60 wt % of the mixed polyethers' weight; more preferably, a copolyol of epoxypropane-epoxyethane or a conjugate thereof, wherein the content of oxy-ethylidene units is 0-12 wt % with an average functionality of 2-4.5 and an average hydroxyl value of 220-790 mgKOH/g, which is in an amount of 35-55 wt % of the mixed polyethers' weight;

(bv) a chain extender and/or a cross-linking agent, in an amount of 0-10 wt %, preferably 0.5-6 wt %, more preferably 1-5.5 wt % of the mixed polyethers' weight;

(c) a surfactant, in an amount of 0-1 wt %, preferably 0.2-0.8 wt %, more preferably 0.4-0.6 wt % of the mixed polyethers' weight;

(d) a catalyst, in an amount of 0-3.5 wt %, preferably 0.5-3 wt %, more preferably 1-2.5 wt % of the mixed polyethers' weight; and (e) an optional additive, comprising one or two or more of color pastes, internal mold release agents, flame retardants, fillers, antistatic agents, perfumes, antioxidants, light stabilizers, mineral oils and antimicrobial agents;

wherein the reaction system has an isocyanate index of 0.6-0.9, preferably 0.6-0.8, more preferably 0.6-0.75.

The isocyanate index of the present invention refers to the molar ratio of NCO groups contained in the polyisocyanate composition to the active hydrogen atoms contained in the isocyanate reactive component. One water molecule contains two active hydrogen atoms, one hydroxyl group contains one active hydrogen atom, one primary amine group contains two active hydrogen atoms and one secondary amine group contains one active hydrogen atom. Higher isocyanate index results in decreased slow-recovery of the foam, increased percentage of closed cell proportion of the foam and increased shrinkage tendency. Further, too low isocyanate index may lead to decrease in the mechanical properties of the foam.

Component (a) of the present invention is a polyisocyanate composition (also known as isocyanate component), which contains 0-5 wt % of toluene diisocyanate. Preferably, component (a) includes one or two or more of toluene diisocyanate, pure diphenylmethane diisocyanate, poly(diphenylmethane diisocyanate) and isocyanate-terminated polyisocyanate prepolymer.

Preferably, component (a) of the present invention comprises 0 wt % of toluene diisocyanate, based on the total weight of the polyisocyanate composition.

The pure diphenylmethane diisocyanate of the present invention includes one or two of diphenylmethane-2,4'-diisocyanate and diphenylmethane-4,4'-diisocyanate.

The poly(diphenylmethane diisocyanate) of the present invention refers to polycyclic polyisocyanate containing three or more than three cycles; preferably WANNATE PM-200 from Yantai Wanhua. The isocyanate-terminated polyisocyanate prepolymer of the present invention refers to the reaction product of an isocyanate and a polyhydroxy compound, wherein the isocyanate includes one or two or more of pure diphenylmethane diisocyanate and poly(diphenylmethane diisocyanate). The polyhydroxy compound (also known as polyol) has a number average molecular weight of 2000-10000 and an average functionality of 2-4 and is used in an amount of the amount of 1-20 wt % of the weight of isocyanate used for preparing the polyisocyanate prepolymer. The polyhydroxy compound may be prepared by the polymerization of at least one initiator selected from polyols (including but not limited to, ethylene glycol, diethylene glycol, propylene glycol, dipropylene glycol, glycerol, trimethylolpropane, pentaerythritol, and sorbitol, etc.) and epoxyethane and/or epoxypropane. Also, the polyhydroxy compound may be prepared by the polymerization of at least one initiator selected from polyamines (including but not limited to, ethylene diamine, toluene diamine, diamino diphenyl methane, polymethylene polyphenyl polyamines and amino alcohols, etc.) and epoxyethane and/or epoxypropane. Examples of suitable polyhydroxy compound include, but are not limited to one or two or more of WANOL F5356, WANOL F5335, WANOL F5342 and WANOL F5256, etc. from Yantai Wanhua.

In one specific embodiment of the present invention, the polyisocyanate composition comprises 50-90 wt % of pure diphenylmethane diisocyanate and 10-50 wt % of poly(diphenylmethane diisocyanate), based on the total weight of the polyisocyanate composition, wherein the pure diphenylmethane diisocyanate comprises 1-45 wt % of diphenylmethane-2,4'-diisocyanate and 55-95 wt % of diphenylmethane-4,4'-diisocyanate, based on the total weight of the pure diphenylmethane diisocyanate. Examples of suitable polyisocyanate composition include, but are not limited to one or two or more of WANNATE 8221, WANNATE 8223, ZQ-1, ZQ-2 and ZQ-3, etc. from Yantai Wanhua.

In another specific embodiment of the present invention, the polyisocyanate composition may be a mixture of isocyanate-terminated polyisocyanate prepolymer (briefly known as isocyanate prepolymer) and other isocyanate homologues. Other isocyanate homologues include one or two or more of pure diphenylmethane diisocyanate and poly(diphenylmethane diisocyanate). Examples of suitable polyisocyanate composition include, but are not limited to one or two or more of WANNATE 8018, WANNATE 8019 and WANNATE 8107, etc. from Yantai Wanhua.

Component (bi) of the present invention is water, which is a single foaming agent, containing no other physical auxiliary foaming agents. The amount of water can be adjusted according to the requirements for foam density and the characteristics of reaction system.

Component (bii) of the present invention is a copolyol of epoxypropane-epoxyethane or a conjugate thereof. The examples thereof include, but are not limited to one or two or more of WANOL F3135 from Yantai Wanhua, TEP330N from Tianjin Petrochemical Company, TEP560 from Tianjin Petrochemical, G330NY from Sinopec Shanghai Gaoqiao Company, FA-703 from KPX Chemical Co., Ltd and DOW4701 from Dow Chemicals, etc.

Component (biii) of the present invention is another copolyol of epoxypropane-epoxyethane or a conjugate thereof. The examples thereof include, but are not limited to one or two or more of WANOL F3140 from Yantai Wanhua, GK350D from Shanghai Gaoqiao, CP1421 from Dow Chemicals and ZS3602 from Zhongshan Chemical, etc.

Component (biv) of the invention is a further copolyol of epoxypropane-epoxyethane or a conjugate thereof. The examples thereof include, but are not limited to one or two or more of DDL-400, DMN-500, DMN-700 and DMN-1000 from Zibo Dexin Lianbang Chemical Industry Co., Ltd, TMN-400, TMN-700, TMN-1000 from Tianjin Petrochemical Company, NT-403A from Shandong Bluestar Chemical Co., Ltd, and GR-835G and GLR2000 from Shanghai Gaoqiao, etc. Such an application can further improve the slow-recovery performance of the foam.

Component (bv) of the present invention is a chain extender and/or a cross-linking agent. The chain extender includes one or two or more of small molecule dials and diamines; preferably ethylene glycol, diethylene glycol, triethylene glycol, propylene glycol, dipropylene glycol, tripropylene glycol, butylene alcohol, 3,5-diethyl toluene diamine (DETDA), 3,5-dimethyl thio-toluene diamine (DMTDA) and 4,4'-bis-(sec-butylamino)diphenylmethane (DBMDA). The cross-linking agent is a small molecule polyol or polyamine having a functionality of greater than 2; preferably one or two or more of glycerol, diethanolamine and triethanolamine, etc. In case of preparing a slow-recovery foam with a low density, alkanolamine cross-linking agents are preferred, which not only play the role of cross-linking the cell network, but also act as a catalyst and balance the speed of foaming and gelling.

Component (c) of the present invention is a surfactant. It plays the role of emulsifying foam materials, stabilizing the foam and regulating the cells. It increases the miscibility of the components, contributes to the formation of the bubble and controls the size and uniformity of the foam, promotes the balance between the gel tension and the foam cell and prevents the foam from collapsing. Surfactants suitable for the present invention include any known surfactants suitable for polyurethane foam materials, preferably polyether siloxane surfactants. An important role of the surfactant is to disperse polyurea as well as increase the compatibility between the polyurea and the foamed matrix, and such a role is achieved by the polyether segments thereof. Examples of components (c) of the invention include, but are not limited to one or two or more of L-580, L-627, L-3002 and Y-10366 from Momentive, DC6070 from Air Products, B-8002 and B8715 from Evonik and AK8812 from Jiangsu Maysta Chemical Co., Ltd, etc.

Component (d) of the present invention is a catalyst. The catalyst may include one or two or more of tertiary amine compounds. Examples of suitable tertiary amine catalysts include, but are not limited to triethylidene diamine, bis(dimethylaminoethyl)ether, N,N,N'-trimethyl-N'-hydroxyethyl-diaminoether, cyclohexylmethyl tertiary amine, pentamethyl dialkylidene triamine, tetramethylalkylidene diamine, dimethyl ethanolamine, N-(3-dimethylaminopropyl)-N,N-diisopropanolamine, N-methyl morpholine, N-methyl imidazole and JEFFCAT LED103 from Huntsman, etc.

Component (e) of the present invention comprises those additives known to the person skilled in the art that may be used in the viscoelastic foam materials of the present invention. The amount of component (e) makes up 0-20 wt % of the mixed polyethers' weight. The additives of this invention include, but are not limited to one or two or more of color pastes, internal mold release agents, flame retardants, fillers, antistatic agents, perfumes, antioxidants, light stabilizers, mineral oils, and antimicrobial agents.

The amounts of the above-mentioned chain extenders and/or cross-linking agents, surfactants, catalysts and additives depend on the desired properties of the product and can be varied within the range known by those skilled in the technical field of polyurethane foam.

The positive effects of the present invention lie in as follows: by selecting mixed polyethers and the polyisocyanate composition, the reaction system according to the present invention may be free of toluene diisocyanate, the raw materials are of little toxicity, and the reaction system may be free of other physical foaming agents except water and may be free of metal catalysts, which does no harm to human health and the environment. In physical performance tests, the prepared foam has a density of 50-70 kg/m$^3$, a ball rebound rate of 15-30% and the maximum sound absorption coefficient of 0.99. With the proviso that the foam possesses low density and viscoelasticity, the foam can maintain excellent sound absorption performance, improve the sound-absorbing effect which is relatively poor in traditional viscoelastic polyurethane foams. The viscoelastic foam of the present invention may be prepared by molding or technique of preparing slab foam and can be widely used in the automotive and furniture industrial products (such as soundproofing carpets, chairs, pillows, cushions, etc.) as well as in the sound absorbing/insulation products.

The following will further describe the viscoelastic sound-absorbing polyurethane foam of the present invention in detail and the preparation method thereof, however, the present invention should not be limited to it in any way.

To determine whether the foam exhibits viscoelasticity and whether the sound absorption performance is good, the properties from the following three aspects are mainly considered.

The first aspect is the ball rebound rate of the foam. Different from foams with a high rebound rates, a slow-recovery foam usually has a ball rebound rate of 30% or less; the test instrument is HTY-B type Foam Rebound Coefficient Instrument from Jiangsu Chemical Research Institute.

The second aspect is the recovery time of the foam. With the proviso that other properties maintain good, the recovery time of slow-recovery foams is generally between 3 s to 15 s. The foam having a recovery time of less than 3 s basically loses the slow-recovery performance, while the foam having a recovery time of more than 15 s lacks elasticity, which results in reduced comfort, especially in low-density foam with limited sustentation per se.

The third aspect is the sound absorption coefficient of the foam. The sound absorption coefficient is determined according to GBT 18696.2-2002 "Measurements of Sound Absorption Coefficient and Sound Impedance in Impedance Tubes"—transfer function method, wherein the testing samples are wafers with a diameter of 100 mm and 30 mm and a thickness of 22 mm, the instrument used for testing is a dual-channel instrument from Beijing Shengwang Company (the type:SW230, the frequency range: 64-6300 Hz).

After 72 hours of curing the foams, various performance tests are carried out according to the following criteria or methods.

| | |
|---|---|
| Density of foam plastics and rubber, kg/cm$^3$ | GB/T 6343-1995 (also, GB/T 24451-2009) |
| Ball rebound rate of soft foam, % | GB/T 6670-2008 (also, GB/T 24451-2009) |
| Sound absorption coefficient of soft foam | GB/T 18696.2-2002 |
| Recovery time of foam, s | GB/T 24451-2009 |

The raw materials involved in the examples of the present invention are described as follows:

Isocyanate reactive component (bii):

Polyether A: having an average functionality of 3, a hydroxyl value of 34 mgKOH/g, 25 wt % EO-75 wt % PO copolymerization, a weight-average molecular weight of 4950, with glycerin as the initiator, purchased by WANOL F3135 from Yantai Wanhua Polyether B: having an average functionality of 3, a hydroxyl value of 56 mgKOH/g, 10 wt % EO-90 wt % PO copolymerization, a weight-average molecular weight of 3000, with glycerol as the initiator, purchased by TEP560 from Tianjin Petrochemical Company Isocyanate reactive component (biii):

Polyether C: having an average functionality of 3, a hydroxyl value of 42 mgKOH/g, 75 wt % EO-25 wt % PO copolymerization, a weight-average molecular weight of 4000, with glycerin as the initiator, purchased by WANOL F3140 from Yantai Wanhua Isocyanate-reactive component (biv):

Polyether D: having an average functionality of 2, a hydroxyl value of 280 mgKOH/g, 100 wt % PO polymerization, a weight-average molecular weight of 400, with dipropylene glycol as the initiator, purchased by DDL-400 from Zibo Dickson Federation Polyether E: having an average functionality of 3, a hydroxyl value of 240 mgKOH/g, 8 wt % EO-92 wt % PO polymerization, a weight-average molecular weight of 700, with glycerol as the initiator, purchased by GLR2000 from Shanghai Gaogiao Petrochemical Polyether F: having an average functionality of 3, a hydroxyl value of 420 mgKOH/g, 100 wt % PO polymerization, a weight-average molecular weight of 400, with glycerol as the initiator, purchased by TMN-400 from Tianjin Petrochemical Company.

Polyether G: having an average functionality of 4, a hydroxyl value of 770 mgKOH/g, 100 wt % PO polymerization, a weight-average molecular weight of 290, with ethylenediamine as the initiator, purchased by NT-403A from Shandong Lanxing Dongda Polyether H: having an average functionality of 4.3, a hydroxyl value of 440 mgKOH/g, 100 wt % PO polymerization, a weight-average molecular weight of 550, with a mixture of sucrose and glycerol as the initiator, purchased by GR-835G from Shanghai Gaoqiao Petrochemical Surfactant A: DABCO DC6070 from Air Products Surfactant B: TEGOSTAB B8715 from EVONIK Cross-linking agent A: triethanolamine Cross-linking agent B: glycerol Cross-linking agent C: diethanolamine Catalyst A: JEFFCAT LED103 from Huntsman Catalyst B: Dabco 33LV (triethylenediamine) from Air Products Catalyst C: JEFFCAT DPA (N-(3-dimethylaminopropyl)-N,N-diisopropanolamine) from Huntsman Catalyst D: Dabco BL-11 from Air Products Catalyst E: Dabco 8154 from Air Products Isocyanate A: WANNATE 8018 from Yantai Wanhua, which is a mixture of polyisocyanate prepolymer, pure diphenylmethane diisocyanate and poly(diphenylmethanediisocyanate), with a NCO content of about 29.5 wt %.

Isocyanate B: WANNATE 8223 from Yantai Wanhua, which is a mixture of pure diphenylmethane diisocyanate and poly(diphenylmethane diisocyanate), with a NCO content of about 32.6 wt %.

Isocyanate C: WANNATE 8102 from Yantai Wanhua, which is a mixture of polyisocyanate prepolymer, pure diphenylmethane diisocyanate and poly(diphenylmethanediisocyanate), with aNCO content of about 27.2 wt %.

As for the inventive Examples and Comparative Examples, the general preparation processes are described as follows:

According to the methods well-known to the person skilled in the art, add the isocyanate reactive component into an 1 L plastic beaker, and stir for 1 minute with a vertical agitator wherein the diameter of round stirring head is 7 cm and the rotational speed is 3000 rpm, then add the polyisocyanate composition and rapidly mix for 5-8 seconds. The mixture is poured into a 20 cm×20 cm×5 cm mold made of aluminum at a temperature of 50-60° C., then the mold is closed for 3 minutes and the foam is taken out of the mold. The temperature of liquid feed before the reaction should be controlled at 25±3° C.

EXAMPLES

The following examples are further illustrations of the present invention, but the present invention will not be limited to these examples. The person skilled in the art would well know that any modification based on these examples will not depart from the spirit of the present invention.

The amount of each component in the following examples is used in parts by weight.

Table 1 shows in the different polyether formulations, the present invention is achieved by using Isocyanate A. The isocyanate reactive components (biii and biv) play the role of improving the characteristics of the slow-recovery foam. The addition of such components can reduce the ball rebound rate and increase the glass transition temperature (Tg).

TABLE 1

Viscoelastic foams prepared from Isocyanate A and properties thereof

| | Examples | A1 | A2 | A3 | A4 | A5 | A6 | A7 |
|---|---|---|---|---|---|---|---|---|
| | | | | Formulations | | | | |
| bii | Polyether A | 50 | 50 | 55 | 50 | 55 | 40 | 40 |
| biii | Polyether C | 10 | 10 | 10 | 10 | 10 | 10 | 10 |
| biv | Polyether D | 20 | 0 | 0 | 17 | 32 | 20 | 30 |
| | Polyether E | 20 | 40 | 35 | 20 | 0 | 30 | 20 |
| | Polyether G | 0 | 0 | 0 | 3 | 3 | 0 | 0 |
| | Surfactant B | 0.5 | 0.5 | 0.5 | 0.5 | 0.5 | 0.5 | 0.5 |
| | Catalyst A | 0.3 | 0.3 | 0.3 | 0.3 | 0.3 | 0.3 | 0.3 |
| | Catalyst B | 1.0 | 1.0 | 1.0 | 1.0 | 1.0 | 1.0 | 1.0 |
| | Catalyst C | 0.3 | 0.3 | 0.3 | 0.3 | 0.3 | 0.3 | 0.3 |
| | Cross-linking agent A | 0.5 | 0.5 | 0.5 | 0.5 | 0.5 | 0.5 | 0.5 |
| | Cross-linking agent B | 5 | 5 | 5 | 5 | 5 | 5 | 5 |
| | Water | 3.5 | 4.0 | 4.0 | 4.0 | 4.0 | 4.0 | 4.0 |
| | Isocyanate A | 75.0 | 77.8 | 77.8 | 77.8 | 77.8 | 77.8 | 77.8 |

TABLE 1-continued

Viscoelastic foams prepared from Isocyanate A and properties thereof

| Isocyanate Index | 0.67 | 0.66 | 0.68 | 0.63 | 0.64 | 0.62 | 0.62 |
|---|---|---|---|---|---|---|---|
| Foam Performance | | | | | | | |
| Core Density, kg/m³ | 58.7 | 57.4 | 59.9 | 58.4 | 55.8 | 59.4 | 58.8 |
| Foam Recovery Time, s | 6 | 6 | 4.5 | 5 | 4 | 6.5 | 7 |
| Ball Rebound Rate, % | 17.4 | 19 | 24 | 23 | 25 | 20 | 22 |

Sound Absorption Characteristics under Vertical Incidence

| Frequency | Sound Absorption Coefficient | | | | | | |
|---|---|---|---|---|---|---|---|
| 500 Hz | 0.20 | 0.29 | 0.21 | 0.22 | 0.20 | 0.26 | 0.22 |
| 1000 Hz | 0.43 | 0.63 | 0.49 | 0.59 | 0.43 | 0.57 | 0.48 |
| 2000 Hz | 0.80 | 0.92 | 0.96 | 0.94 | 0.89 | 0.89 | 0.86 |
| 4000 Hz | 0.88 | 0.89 | 0.82 | 0.75 | 0.86 | 0.87 | 0.90 |
| Maximum sound absorption coefficient | 0.94 | 0.99 | 0.99 | 0.99 | 0.97 | 0.99 | 0.98 |
| Frequency corresponding to the maximum sound absorption coefficient, Hz | 3020 | 2650 | 2380 | 5570 | 2685 | 2720 | 2870 |

Table 2 shows in the different polyether formulations, the present invention is achieved by using Isocyanate B. Compared with Isocyanate A, Isocyanate B has a higher content of isocyanate groups. Within the range of the present invention, desirable foams are obtained by adjusting the kind and amount of water, cross-linking agent and catalyst, etc.

TABLE 2

Viscoelastic foams prepared from Isocyanate B and properties thereof

| | Examples | B1 | B2 | B3 | B4 | B5 | B6 |
|---|---|---|---|---|---|---|---|
| Formulations | | | | | | | |
| bii | Polyether A | 50 | 50 | 58 | 62 | 60 | 60 |
| biii | Polyether C | 5 | 5 | 2 | 5 | 5 | 5 |
| biv | Polyether E | 45 | 45 | 30 | 20 | 20 | 30 |
| | Polyether F | 0 | 0 | 0 | 0 | 15 | 0 |
| | Polyether G | 0 | 0 | 10 | 0 | 0 | 5 |
| | Polyether H | 0 | 0 | 0 | 13 | 0 | 0 |
| Surfactant A | | 0.5 | 0.5 | 0.5 | 0.5 | 0.5 | 0.5 |
| Catalyst A | | 0.2 | 0.3 | 0.3 | 0.3 | 0.3 | 0.2 |
| Catalyst B | | 0.6 | 0.6 | 0.6 | 0.6 | 0.6 | 0.4 |
| Catalyst C | | 1.0 | 1.0 | 1.0 | 1.0 | 1.0 | 0.8 |
| Cross-linking agent C | | 0.5 | 0.5 | 1.0 | 1.0 | 1.0 | 1.0 |
| Cross-linking agent B | | 0 | 5 | 0 | 0 | 0 | 0 |
| Water | | 4.0 | 3.8 | 3.5 | 3.5 | 3.5 | 3.5 |
| Isocyanate B | | 64.0 | 72.5 | 62.0 | 62.0 | 64.1 | 64.0 |
| Isocyanate Index | | 0.72 | 0.68 | 0.67 | 0.74 | 0.76 | 0.76 |
| Foam Performance | | | | | | | |
| Core Density, kg/m³ | | 55.5 | 54.3 | 54.9 | 55.0 | 55.2 | 55.8 |
| Foam Recovery Time, s | | 6 | 6.5 | 6.5 | 4 | 3.5 | 3 |
| Ball Rebound Rate, % | | 21.6 | 19.2 | 20.0 | 21.0 | 20.4 | 21.0 |

Sound Absorption Characteristics under Vertical Incidence

| Frequency | Sound Absorption Coefficient | | | | | |
|---|---|---|---|---|---|---|
| 500 Hz | 0.19 | 0.27 | 0.22 | 0.19 | 0.19 | 0.20 |
| 1000 Hz | 0.40 | 0.67 | 0.48 | 0.43 | 0.51 | 0.51 |
| 2000 Hz | 0.84 | 0.94 | 0.94 | 0.97 | 0.99 | 0.95 |
| 4000 Hz | 0.88 | 0.82 | 0.80 | 0.77 | 0.74 | 0.77 |
| Maximum sound absorption coefficient | 0.97 | 0.99 | 0.99 | 0.99 | 0.99 | 0.99 |
| Frequency corresponding to the maximum sound absorption coefficient, Hz | 2875 | 2570 | 2465 | 2260 | 2080 | 2430 |

Comparative Examples

Table 3 shows slow-recovery foams prepared by using ordinary Isocyanate C having a low content of isocyanate groups. The resulting foam of Comparative Example C1 has a density of 70.1 kg/m³, the resulting foam of Comparative Example C2 has a density 45.5 kg/m³, and either of them has a ball rebound rate of less than 15% as well as the maximum sound absorption coefficient is less than 0.70.

TABLE 3

Viscoelastic foams prepared from Isocyanate C and properties thereof

| | Comparative Example C1 | Comparative Example C2 |
|---|---|---|
| Formulations | | |
| Polyether B | 20 | 15 |
| Polyether C | 30 | 40 |
| Polyether D | 0 | 10 |
| Polyether E | 50 | 35 |
| Surfactant B | 0.3 | 0.3 |
| Catalyst D | 0.25 | 0.25 |
| Catalyst B | 0.40 | 0.40 |
| Catalyst E | 0.50 | 0.60 |
| Cross-linking agent C | 0.8 | 0.8 |
| Water | 2.0 | 3.2 |
| Isocyanate C | 52.1 | 63.3 |
| Isocyanate Index | 0.67 | 0.66 |
| Foam Performance | | |
| Core Density, kg/m³ | 70.1 | 45.5 |
| Foam Recovery Time, s | 7 | 9 |
| Ball Rebound Rate, % | 8 | 6 |
| Sound Absorption Characteristics under Vertical Incidence | | |
| Frequency | Sound Absorption Coefficient | |
| 500 Hz | 0.34 | 0.21 |
| 1000 Hz | 0.52 | 0.50 |
| 2000 Hz | 0.50 | 0.62 |
| 4000 Hz | 0.48 | 0.47 |
| Maximum sound absorption coefficient | 0.68 | 0.66 |
| Frequency corresponding to the maximum sound absorption coefficient, Hz | 730 | 1670 |

The invention claimed is:

1. A sound-absorbing viscoelastic polyurethane foam, characterized in that the foam is prepared from a reaction system comprising the following components:
   (a) a polyisocyanate composition comprising 0-5 wt % of toluene diisocyanate, based on the total weight of the polyisocyanate composition, wherein the number average functionality of isocyanate groups in the polyisocyanate composition is 2-2.4 and the NCO content is 20-35 wt %;
   (b) an isocyanate-reactive component consisting of:
   (bi) water, in an amount of 2-5 wt % of the weight of mixed polyethers;
   (bii) a copolyol of epoxypropane-epoxyethane or a conjugate thereof, wherein the content of oxy-ethylidene units is 5-35 wt % with an average functionality of 2-4 and an average hydroxyl value of 20-65 mgKOH/g, which is in an amount of 30-70 wt % of the weight of mixed polyethers;
   (biii) a copolyol of epoxypropane-epoxyethane or a conjugate thereof, wherein the content of oxy-ethylidene units is 75-80 wt % with an average functionality of 2.8-3.5 and an average hydroxyl value of 35-60 mgKOH/g, which is in an amount of 2-10 wt % of the weight of mixed polyethers;
   (biv) a polyether polyol of epoxypropane-epoxyethane or a conjugate thereof, wherein the content of oxy-ethylidene units is 0-20 wt % with an average functionality of 2-5 and an average hydroxyl value of 180-830 mgKOH/g, which is in an amount of 20-65 wt % the weight of mixed polyethers;
   (bv) a chain extender and/or a cross-linking agent, in an amount of 0-10 wt % of the weight of mixed polyethers;
   wherein the mixed polyethers are mixtures of component (bii), component (biii) and component (biv), and in the mixed polyethers, the sum of the weight percent of components (bii), component (biii) and component (biv) is 100 wt %;
   (c) a surfactant, in an amount of 0-1 wt % the weight of mixed polyethers;
   (d) a catalyst, in an amount of 0-3.5 wt % of the weight of mixed polyethers; and
   (e) an optional additive, comprising one or two or more of color pastes, internal mold release agents, flame retardants, fillers, antistatic agents, perfumes, antioxidants, light stabilizers, mineral oils and antimicrobial agents;
   wherein the reaction system has an isocyanate index of 0.6-0.8.

2. The foam according to claim 1, characterized in that the polyisocyanate composition includes one or two or more of toluene diisocyanate, pure diphenylmethane diisocyanate, poly(diphenylmethane diisocyanate) and isocyanate-terminated polyisocyanate prepolymer.

3. The foam according to claim 1, characterized in that the polyisocyanate composition has a number average functionality of isocyanate groups of 2.1-2.3 and a NCO content of 25-33 wt %.

4. The foam according to claim 1, characterized in that the amount of component (bi) makes up 2.5-4.5 wt %, of the weight of mixed polyethers.

5. The foam according to claim 1, characterized in that in component (bii), the content of oxy-ethylidene units is in an amount of 8-30 wt % with an average functionality of 2.7-3 and an average hydroxyl value of 30-60 mgKOH/g, which is in an amount of 40-65 wt % of the weight of mixed polyethers.

6. The foam according to claim 1, characterized in that in component (biv), the content of oxy-ethylidene units is in an amount of 0-15 wt % with an average functionality of 2-4.8 and an average hydroxyl value of 200-810 mgKOH/g, which is in an amount of 30-60 wt % of the weight of mixed polyethers.

7. The foam according to claim 1, characterized in that the amount of component (bv) makes up 0.5-6 wt % of the weight of mixed polyethers; the amount of component (c) makes up 0.2-0.8 wt % of the weight of mixed polyethers; the amount of component (d) makes up 0.5-3 wt % of the weight of mixed polyethers.

8. The foam according to claim 1, characterized in that the foam has a density of 50-70 kg/m³, a ball rebound rate of 15-30%, a sound absorption coefficient of 0.15-0.35 at 500 Hz, a sound absorption coefficient of 0.40-0.70 at 1000 Hz and a sound absorption coefficient of 0.80-0.99 at 2000 Hz; wherein the sound absorption coefficient is achieved by determining 22mm-thick foam via standing wave tube method.

9. The foam according to claim 1, characterized in that the reaction system has an isocyanate index of 0.6-0.75.

10. The foam according to claim 2, characterized in that the polyisocyanate composition comprises 0 wt % of toluene diisocyanate.

11. The foam according to claim 4, characterized in that the amount of component (bi) makes up 3-4 wt % of the weight of mixed polyethers.

12. The foam according to claim 5, characterized in that in component (bii), the content of oxy-ethylidene units is in an amount of 10-28 wt % with an average functionality of 2.7-3 and an average hydroxyl value of 32-58 mgKOH/g, which is in an amount of 45-60 wt % of the weight of mixed polyethers.

13. The foam according to claim 6, characterized in that in component (biv), the content of oxy-ethylidene units is in an amount of 0-12 wt % with an average functionality of 2-4.5 and an average hydroxyl value of 220-790 mgKOH/g, which is in an amount of 35-55 wt % of the weight of mixed polyethers.

14. The foam according to claim 7, characterized in that the amount of component (bv) makes up 1-5.5 wt % of the weight of mixed polyethers; the amount of component (c) makes up 0.4-0.6 wt % of the weight of mixed polyethers; the amount of component (d) makes up 1-2.5 wt % of the weight of mixed polyethers.

15. The foam according to claim 1, wherein the foam has a ball rebound rate of 15-30%.

\* \* \* \* \*